Patented Mar. 18, 1952

2,589,684

UNITED STATES PATENT OFFICE 2,589,684

RECOVERY OF SO$_2$

Herbert A. Edge, Norton-on-Tees, England, assignor to Imperial Chemical Industries Limited, a corporation of Great Britain No Drawing. Application September 20, 1948, Serial No. 50,233. In Great Britain October 3, 1947

7 Claims. (Cl. 23—178)

This invention relates to the production of sulphuric acid, and more particularly to the separation and recovery of sulphur dioxide from gaseous mixtures containing it. Such gaseous mixtures may be obtained, for example, by the calcining of anhydrite, as a preliminary step in the manufacture of cement.

According to the present invention there is provided a process for the production of sulphuric acid, which comprises bringing a gaseous mixture containing sulphur dioxide into contact with an aqueous solution containing ammonium sulphite and ammonium bisulphite, whereby the sulphur dioxide is absorbed; recovering the said sulphur dioxide by treating the solution with nitric acid, and subsequently passing the sulphur dioxide to a conventional sulphuric acid process.

The liquor remaining after the treatment with nitric acid is substantially an aqueous solution of ammonium nitrate, and it is a further feature of the process to produce crystalline ammonium nitrate by the evaporation of this liquor.

The sulphur dioxide-containing gas may be brought into contact with the solution containing ammonium sulphite and ammonium bisulphite in any suitable vessel, such as for example an absorption tower, and the process may be operated either batchwise or continuously. For continuous operation it has been found convenient to use two absorption vessels arranged in series with respect to the flow of the gas and in parallel with respect to the flow of the solution.

It is desirable for the solution containing ammonium sulphite and ammonium bisulphite to be maintained as a concentrated solution, while avoiding the possibility of precipitating crystals in any part of the absorption system, as this reduces the amount of water to be evaporated from the liquor resulting from the treatment with nitric acid.

It has been found convenient for the satisfactory operation of the process to maintain the aqueous solution containing ammonium sulphite and ammonium bisulphite during the absorption of sulphur dioxide at a pH value within the range of about 4.9 to about 5.6, and preferably within the range of about 5.2 to about 5.6 by the addition, either intermittently or continuously, of ammonia which may be aqueous ammonia, the concentration of the solution being maintained in terms of the molecular ratio of $SO_2:NH_3:H_2O$ within the range of about 1:1.15:3.1 to about 1:1.3:5. More preferably the pH value of the solution is maintained at about 5.6. This pH value may be obtained, for example, by employing a solution of the following composition, the parts being by weight,

| | Parts |
|---|---|
| Ammonia (NH$_3$) | 12.4 |
| Sulphur dioxide (SO$_2$) | 36.4 |
| Water | 51.2 |

Although it might be expected that the treatment with nitric acid of the solution containing ammonium sulphite and ammonium bisulphite would give rise to the formation of oxides of nitrogen we have found that these are not present in sufficient quantities to be deleterious in the subsequent conversion to sulphuric acid provided that the quantity of nitric acid present is not more than 80% in excess of that stoichiometrically required for liberating the sulphur dioxide. It is preferred however to operate the process with the nitric acid present in only slight excess of the stoichiometrically required amount.

The treatment of the solution with the nitric acid is conveniently carried out at normal temperatures; and it is not necessary to make provision for control of the temperature of operation.

In order to minimise the evolution of oxides of nitrogen it has been found convenient to agitate the reaction mixture, for example, by stirring, to prevent local high concentrations of nitric acid. As an alternative, ammonium nitrate solution from the process may be mixed with the nitric acid before or while the acid passes into the solution containing ammonium sulphite and ammonium bisulphite.

The concentration of the nitric acid employed may be varied within wide limits but it has been found convenient to use acid containing from about 35% to about 60% by weight of HNO$_3$.

The liquor resulting from the treatment with nitric acid, while essentially a solution of ammonium nitrate, will contain a small amount of ammonium sulphate produced by oxidation of the sulphite in the absorption vessels. This sulphate may be removed by any suitable process, for example, by precipitation using an alkaline earth metal salt, preferably the nitrate, prior to the production of solid ammonium nitrate by evaporation, or the whole of the liquor may be used in the working up of mixed fertilizers, for example, the fertilizer sold under the registered trade-mark "Nitro-Chalk."

The sulphur dioxide resulting from the method of separation and recovery hereinbefore described, is substantially concentrated and pure, and after the addition of air, or preferably oxygen, is particularly suited to the production of sulphuric acid by any conventional contact process employing known catalysts, such as for example, platinum or vanadium pentoxide.

I claim:

1. A process for recovering sulphur dioxide from gaseous admixtures containing the same which comprises bringing a gaseous mixture containing sulphur dioxide into contact with an aqueous solution containing ammonium sulfite and ammonium bisulfite whereby the sulphur dioxide is absorbed and recovering said absorbed sulphur dioxide by treating the solution with nitric acid, the quantity of nitric acid being at most 80% in excess of that stoichiometrically required.

2. A process for recovering sulphur dioxide from gaseous admixtures containing the same which comprises bringing a gaseous mixture containing sulphur dioxide into contact with an aqueous solution containing ammonium sulfite and ammonium bisulfite, the pH value of the solution being maintained within the range of 4.9 to 5.6 by the addition of ammonia whereby the sulphur dioxide is absorbed and recovering the said absorbed sulphur dioxide by treating the solution with nitric acid, the quantity of nitric acid being at most 80% in excess of that stoichiometrically required.

3. A process as set forth in claim 2 wherein the pH value of the aqueous solution containing ammonium sulfite and ammonium bisulfite is maintained within the range of 5.2 to 5.6.

4. A process for recovering sulphur dioxide from gaseous admixtures containing the same which comprises bringing a gaseous mixture containing sulphur dioxide into contact with an aqueous solution containing ammonium sulfite and ammonium bisulfite, the composition of said solution being maintained, in terms of the molecular ratios of $SO_2:NH_3:H_2O$, within the range of 1:1.15:3.1 to 1:1.3:5, whereby the sulphur dioxide is absorbed and recovering the said sulphur dioxide by treating the solution with nitric acid, the quantity of nitric acid being at most 80% in excess of that stoichiometrically required.

5. A process for recovering sulphur dioxide from gaseous mixtures containing the same which comprises bringing a gaseous mixture containing sulphur dioxide into contact with an aqueous solution containing ammonium sulfite and ammonium bisulfite, the composition of the aqueous solution, in terms of the molecular ratios of $SO_2:NH_3:H_2O$, being maintained within the range 1:1.15:3.1 to 1:1.3:5 by the continuous addition of ammonia whereby sulphur dioxide is absorbed and recovering the said sulphur dioxide by treating the solution with nitric acid, the quantity of nitric acid being at most 80% in excess of that stoichiometrically required.

6. A process for recovering sulphur dioxide from gaseous mixtures containing the same which comprises bringing a gaseous mixture containing sulphur dioxide into contact with an aqueous solution containing ammonium sulfite and ammonium bisulfite whereby the sulphur dioxide is absorbed and recovering the said sulphur dioxide by treating the solution with nitric acid containing from about 35% to about 60% by weight of $HNO_3$, the quantity of nitric acid being at most 80% in excess of that stoichiometrically required.

7. A process for the production of sulphuric acid which comprises bringing a gaseous mixture containing sulphur dioxide into contact with an aqueous solution containing ammonium sulfite and ammonium bisulfite whereby sulphur dioxide is absorbed, recovering the said sulphur dioxide by treating the solution with nitric acid, the quantity of nitric acid being at most 80% in excess of that stoichiometrically required, and subsequently passing the recoverd sulphur dioxide to a conventional sulphuric acid producing process.

HERBERT A. EDGE.

REFERENCES CITED

The following references are of record in the file of this patent:

UNITED STATES PATENTS

| Number | Name | Date |
|---|---|---|
| 2,161,055 | Johnstone | June 6, 1939 |
| 2,233,841 | Lepsoe | Mar. 4, 1941 |

FOREIGN PATENTS

| Number | Country | Date |
|---|---|---|
| 490,512 | Great Britain | Aug. 11, 1938 |

OTHER REFERENCES

Jones: "Inorganic Chemistry," page 400. Philadelphia Blakiston Co., 1947.